Figure 1:
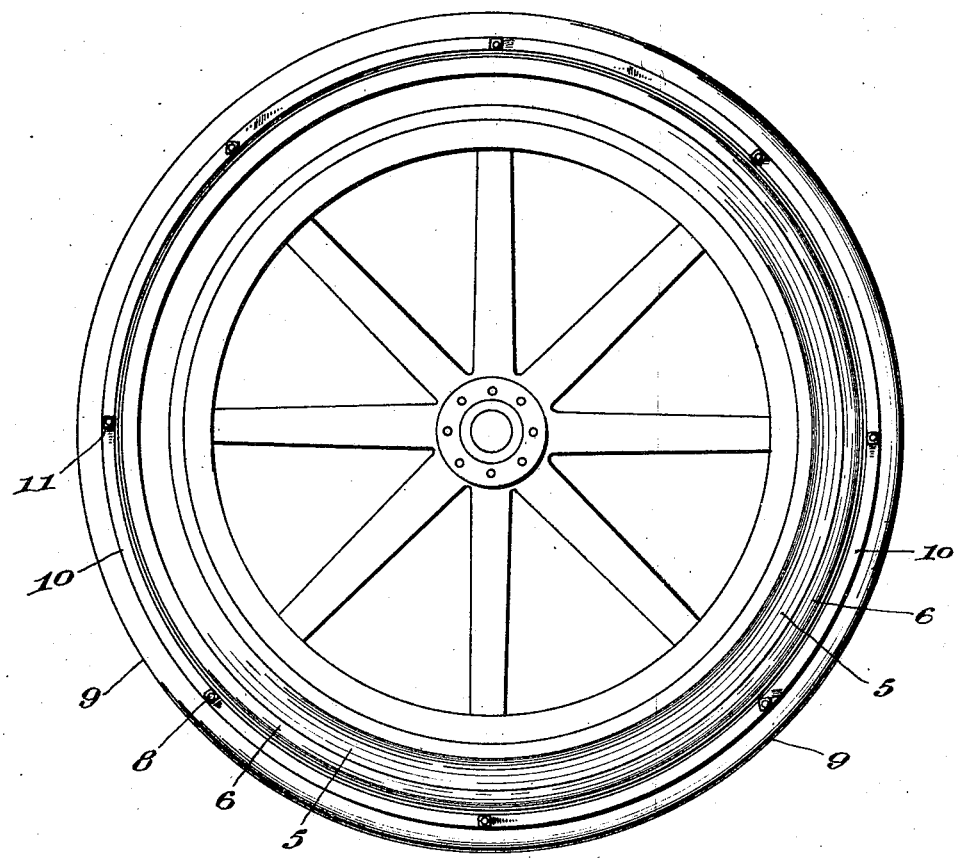

M. T. BRANSFIELD.
TIRE PROTECTOR.
APPLICATION FILED MAR. 8, 1921.

1,435,448.

Patented Nov. 14, 1922.

Inventor:
Michael T. Bransfield.

By

Attorneys.

UNITED STATES PATENT OFFICE.

MICHAEL T. BRANSFIELD, OF CHICAGO, ILLINOIS.

TIRE PROTECTOR.

Application filed March 8, 1921. Serial No. 450,565.

*To all whom it may concern:*

Be it known that I, MICHAEL T. BRANSFIELD, a citizen of the United States, residing at Chicago, in the county of Cook and State of Illinois, have invented new and useful Improvements in Tire Protectors, of which the following is a specification.

This invention relates to devices applicable to pneumatic and similar tires for taking up road wear and for preventing punctures, and the object of the invention is to provide a very simple and efficient device of this kind which can be readily fitted to the tire, and also removed for renewal when worn and unfit for further use.

The object stated is attained by means of a novel combination and arrangement of parts to be hereinafter described and claimed, and in order that the same may be better understood, reference is had to the accompanying drawing forming a part of this specification.

Figure 2:
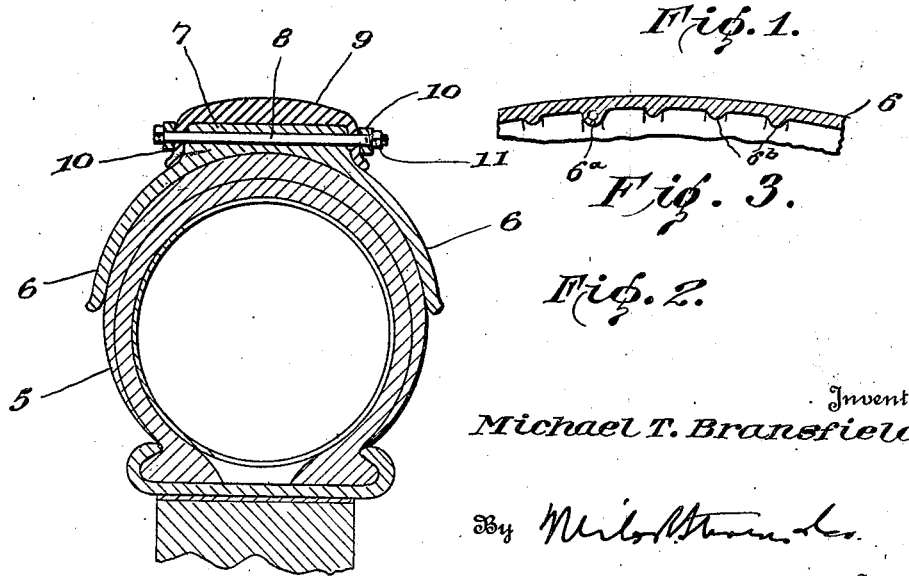

In the drawing,

Figure 1 is an elevation of a tire fitted with the device which is the subject matter of the present application for patent; Fig. 2 is an enlarged cross section of the same, and Fig. 3 is a longitudinal section showing a modification of one of the elements of the device.

Referring specifically to the drawing, 5 denotes the outer casing of an ordinary pneumatic tire. Over the tread of the casing, or that portion which is in contact with the road surface, is fitted a ring 6 which is curved in cross-section so as to conform to the cross-sectional contour of the casing. Midway between its edges, or directly over the tread of the casing, the ring is thickened to form a continuous annular rib 7 which is transversely apertured to take cross-bolts 8. The outer surface of the rib 7 is faced with a tread band 9 which may be the tread portion of an old or discarded tire casing, the same being cut away to fit the outer surface of the rib as well as the sides thereof. Against the side portions of the tread band 9 are placed clamping rings 10 which are secured by the bolts 8 and the nuts 11 of the latter, whereby the tread band is securely held in place.

The ring 6 is made of pressed steel, and it is applied to the tire before the latter is inflated. After the tire is inflated it completely fills up the inside of the ring, and the latter is now firmly held in place on the tire so that it cannot creep thereon. The band 9 takes all the road wear and the tire is completely protected against punctures. When worn away so as to be unfit for further use, the tread band can be readily removed and a new band put in its place. The device is therefore very simple and inexpensive, and it effectually serves the purpose for which it has been designed. Instead of using old tire casings, for the tread band, a specially constructed band may be provided.

Figure 3:

Fig. 3 shows a fragment of a slightly modified form of ring 6, the rib 7 being left off, and the inner surface of the ring being formed at intervals with cross ribs $6^a$ which are apertured to take the bolts 8. Other cross ribs $6^b$ are also provided which fit against the tire tread and assist in preventing the ring from creeping.

I claim:

A tire protector comprising a metallic ring shaped to fit over the tread of a tire, and having a circumferential external rib, transverse bolts carried by the rib, a tread band fitting the outer face of the rib, and the sides thereof, and clamping rings engaging the side portions of said band, and secured by the aforesaid bolts.

In testimony whereof I affix my signature.

MICHAEL T. BRANSFIELD.